United States Patent
Vaudreuil et al.

(10) Patent No.: US 7,159,906 B1
(45) Date of Patent: Jan. 9, 2007

(54) METHODS AND APPARATUS FOR FLANGE SEALING

(75) Inventors: Norman U. Vaudreuil, deceased, late of Dunnellon, FL (US); by June E. Vaudreuil, legal representative, Dunnellon, FL (US); David N. Vaudreuil, Dunnellon, FL (US)

(73) Assignee: A&N Corporation, Williston, FL (US)

( * ) Notice: Subject to any disclaimer, the term of this patent is extended or adjusted under 35 U.S.C. 154(b) by 0 days.

(21) Appl. No.: 10/771,484

(22) Filed: Feb. 2, 2004

Related U.S. Application Data

(60) Provisional application No. 60/443,890, filed on Jan. 31, 2003.

(51) Int. Cl.
*F16L 17/00* (2006.01)

(52) U.S. Cl. ...................... 285/364; 285/367
(58) Field of Classification Search ........... 285/365, 285/364, 363, 112, 366, 367, 368
See application file for complete search history.

(56) References Cited

U.S. PATENT DOCUMENTS

| | | | | |
|---|---|---|---|---|
| 1,906,826 A | * | 5/1933 | Smith et al. | 285/331 |
| 2,992,840 A | * | 7/1961 | Reynolds et al. | 285/332.3 |
| 3,016,249 A | * | 1/1962 | Contreras et al. | 285/336 |
| 3,669,474 A | * | 6/1972 | Bode | 285/336 |
| 3,979,014 A | | 9/1976 | Iwase et al. | |
| 4,361,331 A | | 11/1982 | Kohler | |
| 4,573,717 A | * | 3/1986 | Peacock | 285/365 |
| 4,616,860 A | * | 10/1986 | Faria et al. | 285/368 |
| 5,630,592 A | * | 5/1997 | Obara et al. | 285/336 |
| 5,951,066 A | * | 9/1999 | Lane et al. | 285/364 |
| 6,045,033 A | * | 4/2000 | Zimmerly | 228/189 |
| 6,227,575 B1 | | 5/2001 | Monning et al. | |
| 6,234,545 B1 | * | 5/2001 | Babuder et al. | 285/364 |

FOREIGN PATENT DOCUMENTS

| | | | | |
|---|---|---|---|---|
| DE | 3741782 | * | 6/1989 | 285/365 |
| JP | 634086 | * | 2/1994 | 285/367 |

OTHER PUBLICATIONS

"A&N Quick Flange Components" (Brochure) A&N Corporation, 1982.
"CF Flange System" (Brochure) A&N Corporation, 1991.
"Introduction: ASA Flanges" (Brochure) A&N Corporation, 1990.
"LF Introduction: Features of A&N ISO-LF Components" (Brochure) A&N Corporation, 1986.
"Tri-Seal Catalog" (Brochure) A&N Corporation, 1993.

* cited by examiner

*Primary Examiner*—David Bochna
(74) *Attorney, Agent, or Firm*—Saliwanchik, Lloyd & Saliwanchik

(57) ABSTRACT

Embodiments of the invention, can utilize a flange system incorporating metal sealing. In a further specific embodiment, the subject invention can utilize stainless steel sealing, where the flanges and seals are stainless steel. The subject seal may be made and released and remade multiple times. In a specific embodiment, the subject seal may be unaffected by heat extremes and more resistant to corrosive environments than copper and other soft metal seals. The subject invention can utilize sexless flanges, so as to avoid male/female design problems and can utilize infinitely rotatable flanges. The subject infinitely rotatable flanges eliminate bolt hole alignment problems, such that rotatable bolted flanges are not needed.

33 Claims, 8 Drawing Sheets

METHODS AND APPARATUS FOR FLANGE SEALING

CROSS-REFERENCE TO A RELATED APPLICATION

This application claims the benefit of U.S. Provisional application No. 60/443,890, filed Jan 31, 2003.

BACKGROUND OF THE INVENTION

There is a vast array of flange, fitting, and valve systems, which can be utilized for a multitude of applications. Various industries, of course, each have unique and diverse needs which must be met, and as a result each have preferred systems which function best within their specific applications. Many applications utilize systems, which have fittings and valves that have permanent connections, such as water lines a home, hot water tanks, and underground sprinkler systems. These applications can utilize fittings such as elbows, tees, and crosses, along with valves to control or isolate the water which flows through the lines. These applications typically utilize copper or plastic fittings which can be welded or glued together wherever joints are needed. The seals are leak tight but are typically also permanent such that the seals cannot be made, and then unmade and made again.

In contrast, the subject invention pertains to systems where connections can be assembled, and then disassembled and reassembled again multiple times. Systems needing to incorporate non-permanent seals can utilize flange sealing technologies. Flange sealing having flange seals which can be repeatedly made and unmade are extensive and incredibly diverse in their various approaches to creating a leak tight seal between joints. Certain characteristics and designations can be used to describe them, including sexless and infinitely rotatable.

A sexless flange seal refers to a flange seal where the flanges on each side of a joint are such that any flange on any fitting or valve can mate directly with another as long as they are in the same size category. This can simplify system design. An example of a system that is not sexless is the National Pipe Thread (NPT) technology. This system utilizes fittings with tapered external male threads, which fit into tapered internal female threads. Designers must be constantly vigilant to ensure that the proper interface can occur because of the nature of this system.

An infinitely rotatable flange seal refers to a flange seal where the flanges may be rotated independently of each other and still be able to create a seal, independent of the relative rotation of the sealing flanges. In contrast, many flange systems utilize bolts to mate one flange to another, eg; ASA or ANSI flanges or Con Flat® flanges. As the bolts are tightened the flanges are forced together and compress against a seal. The problem occurs when a certain orientation must occur from one fitting to another. For example, a valve must be installed in a certain position to allow access to open and close it. If the bolted flange on the valve and its adjacent fitting are both fixed, the bolthole orientation of the valve cannot be altered to make this happen. These systems may address this problem by offering rotatable versions of this type flange. Again, the designer must be keenly aware of the potential for orientation problems and be sure to designate which fitting or valve will need to have a rotatable flange and on which end of the component. Infinitely rotatable flange systems do not typically utilize bolts to draw the flanges together against a seal. Drawing the flanges together can be accomplished by using various clamping devices, which allow each flange to infinitely rotated. Orientation of any valve or fitting in relation to the other is easily accomplished and makes design of the system much simpler. Further, clamping devices are typically much easier to assemble and disassemble than bolted style flanges. Examples of this type system are ISO, KF (QF) MF (LF) found in the vacuum/semiconductor industry, and Tri Clover® sanitary fittings often seen in the beverage and dairy industry.

Two materials which are commonly utilized at the point of seal are elastomers and metals. Seals relying on these materials are often referred to as elastomer seals and metals seals. Most applications utilize flange systems which employ a seal between flange connections that is soft, maleable and resilient. It can be used over and over again. Various compound elastomer "O" rings and gaskets are examples of this type seal. Elastomer compounds can be designed to accomplish a seal in various conditions found in a multitude of applications. However, in many cases the conditions may exceed the capabilities of known elastomer compounds. Examples of such conditions include the following:

1. Temperature range—well below 0° F. to 1000+ F.

2. Pressure ranges—$10^{-10}$ mm of Hg to positive pressure in +100° PSI

3. Exposure to various chemical compounds, either liquid or gaseous, having corrosive properties which may attack the elastomer substance.

Different elastomer compounds have been created to best suit the needs of various applications. However, certain conditions exist, such as with the above examples, which go beyond the capabilities of typical elastomer substances. In particular, there are no elastomer compounds, known to the author, that can withstand certain extreme temperature ranges in either direction, certain chemical corrosives, certain extreme pressures (either vacuum or high positive pressure), and/or combinations of all these conditions. For many of these applications elastomer seals will not work. Extreme applications of this sort can require all metal systems which utilize a metal seal between two metal flanges to create a leak light joint.

Metal flange sealing systems typically utilize a softer type metal between two flanges that compress the softer metal seal between them. A good example of this genre is the Conflat® flange. Extensively used in the high vacuum industry, two sexless, stainless steel flanges are bolted together. A "knife edge" on each flange is pressed into a copper gasket to create a seal. Other systems can utilize various soft metals such as aluminum, zinc, silver, or even gold to accomplish the seal. The ability to withstand more stringent elements of temperature, pressure, or corrosive chemicals is greater with various metals than with typical elastomer compounds. The downside of metal seals is the amount of force (torque) required to make the seal, which usually means a multitude of bolts. This can make assembly and disassembly time consuming and difficult. Further, the seal is typically "deformed" in the sealing process and not normally reusable. Every time a joint is made and unmade a new metal seal is usually required to remake the connection. Further, the soft metals used for seals have the additional problem of becoming too soft at very high temperatures, and can shrink at different rates than the flanges at extremely low temperatures so that sealing can become problematic.

BRIEF SUMMARY OF THE INVENTION

The subject invention pertains to a method and apparatus for creating a seal. In a specific embodiment, the subject invention can utilize a flange system incorporating metal sealing. In a further specific embodiment, the subject invention can utilize stainless steel sealing, where the flanges and seals are stainless steel. In a specific embodiment, the subject seal may be made and released and remade multiple times. In a specific embodiment, the subject seal may be unaffected by heat extremes and more resistant to corrosive environments than copper and other soft metal seals. In a specific embodiment, the subject invention can utilize sexless flanges, so as to avoid male/female design problems. In another specific embodiment, the subject invention can utilize infinitely rotatable flanges. In a further specific embodiment, the subject infinitely rotatable flanges eliminate bolt hole alignment problems, such that rotatable bolted flanges are not needed.

In another specific embodiment, the subject invention can incorporate a single clamping mechanism for use in bringing the flanges together to create a seal and/or in holding the flanges together once the seal is made. The use of a single clamping mechanism can reduce assembly time, as opposed to tightening a multitude of bolts. In a further specific embodiment, the subject invention can incorporate a multiple use flange, which can utilize either an elastomer seal or a metal seal. The subject system that can employ either type seal offers greater range of applications and range of use to the designer. The subject flanges, valves, and fittings can be used in the high vacuum and semiconductor industries.

A specific embodiment of the subject invention can be referred to as a "V" seal design. The subject V-seal design can be utilized with high vacuum flange sealing systems. In a specific embodiment, the V-seal design can be applied up to a 2" flange system, up to a 4" flange system, and/or to larger diameter systems as well. A clamp design can also be incorporated, which can to enable these larger sizes to seal properly.

BRIEF DESCRIPTION OF DRAWINGS

FIG. 9A shows a blow-up of view A from FIG. 9B.

DETAILED DESCRIPTION OF INVENTION

Figure 1:
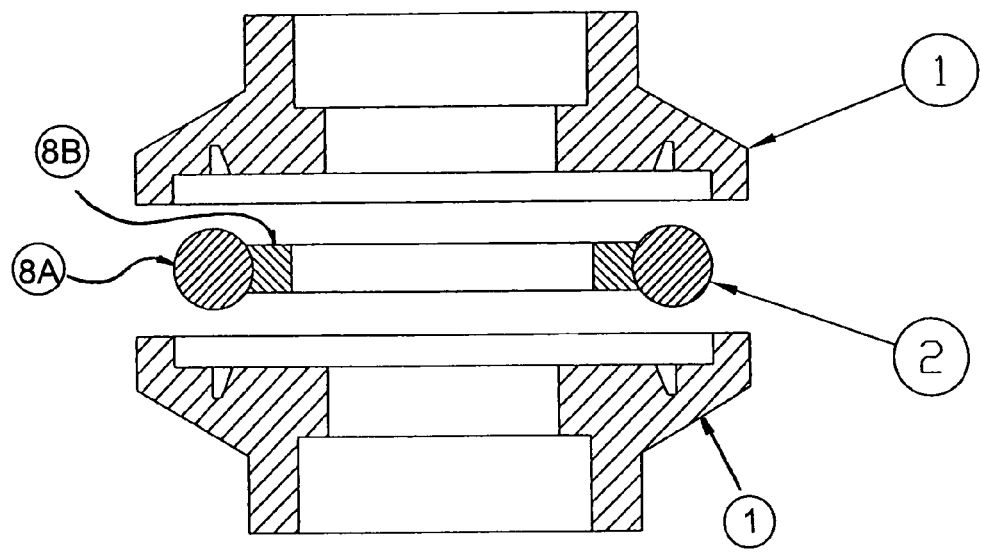
FIG. 1 shows 2 "V" seal flanges with an elastomer seal between them, in a disassembled state.

The subject invention pertains to a method and apparatus for creating a seal. In a specific embodiment, the subject invention can utilize a flange system incorporating metal sealing. In a specific embodiment, the flange can be formed of the same material as the seal. In a further specific embodiment, the subject invention can utilize stainless steel sealing, where the flanges and seals are stainless steel. In an alternative embodiment, the seal and flange can be formed of different materials. For example, the seal material can be softer than the flange material. By having a seal of softer material than the flange, the knife-edge of the flange can be protected from becoming dull over time and can allow more re-uses of the flange. Other materials can be utilized with the subject flanges and seals, including, but not limited to, steel, stainless steel, aluminum, brass, monel, incanel, and titanium. Examples of flange and seal material combinations include, but are not limited to, stainless steel flanges and copper metal seal; stainless steel flanges and elastomer seal; stainless steal flanges and aluminum seal; and titanium flanges and brass seal.

In a specific embodiment, the subject seal may be made and released and remade multiple times. In a specific embodiment, the subject seal may be unaffected by heat extremes and more resistant to corrosive environments than copper and other soft metal seals. In a specific embodiment, the subject invention can utilize sexless flanges, so as to avoid male/female design problems. In another specific embodiment, the subject invention can utilize infinitely rotatable flanges. In a further specific embodiment, the subject infinitely rotatable flanges eliminate bolt hole alignment problems, such that rotatable bolted flanges are not needed.

In another specific embodiment, the subject invention can incorporate a single clamping mechanism for use in bringing the flanges together to create a seal and/or in holding the flanges together once the seal is made. The use of a single clamping mechanism can reduce assembly time, as opposed to tightening a multitude of bolts. A variety of single clamping mechanisms are known in the art and can be used in conjunction with the subject invention. FIG. 9B illustrates an embodiment of the subject invention incorporating a single clamping mechanism for bringing two flanges together with a seal between the flanges and holding the flanges together so as to create a seal between the seal and each flange. The subject flanges can also use other means for bringing the flanges together and/or holding the flanges together once the seal is made, such as bolts or other means known in the art. In a further specific embodiment, the subject invention can incorporate a multiple use flange, which can utilize either an elastomer seal or a metal seal. The subject system that can employ either type seal offers greater range of applications and range of use to the designer.

The subject flanges, valves, and fittings can be used in the high vacuum and semiconductor industries. A specific embodiment of the subject invention can be referred to as a "V" seal design. The subject V-seal design can be utilized with high vacuum flange sealing systems. In a specific embodiment, the V-seal design can be applied up to a 1" flange system, up to a 2" flange system, up to a 3" flange system, up to a 4" flange system, and/or to larger diameter systems as well. A clamp design can also be incorporated, which can be enable these larger sizes to seal properly.

Figure 2:
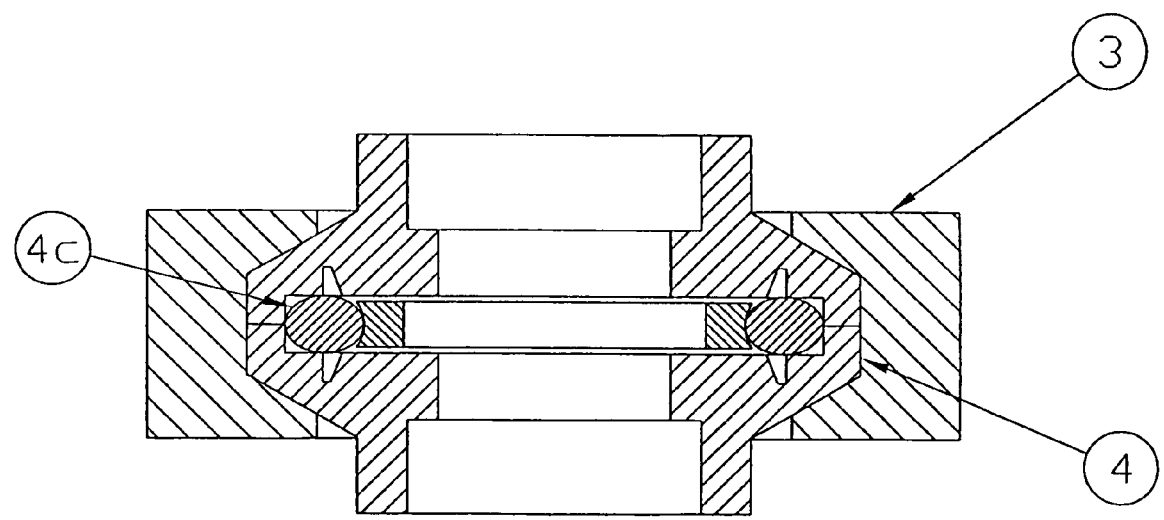
FIG. 2 shows 2 "V" seal flanges with an elastomer seal, in an assembled or compressed state utilizing a clamp for compression.
Figure 3B:
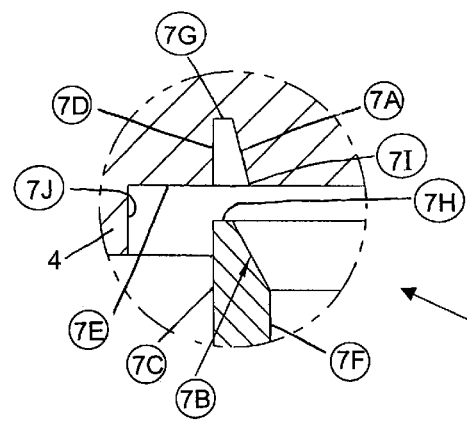
FIGS. 3 shows 2 "V" seal flanges with a metal seal between them, in a disassembled state.
Figure 3A:
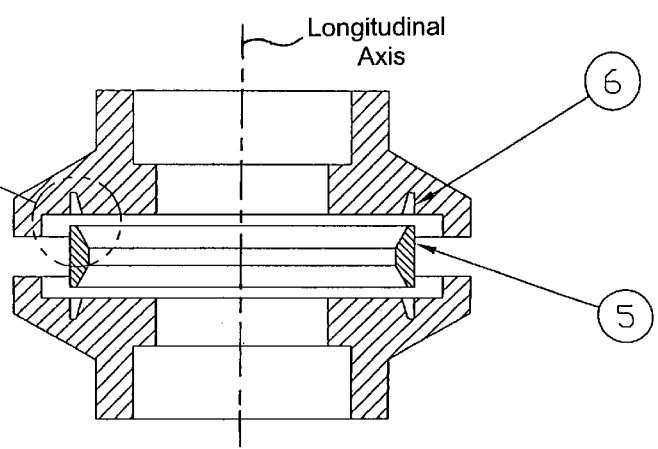
Figure 4:
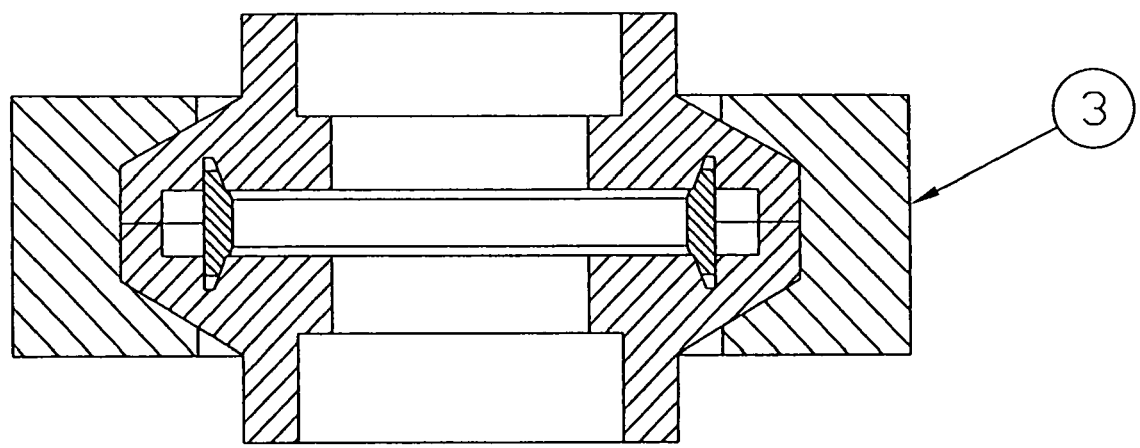
FIG. 4 shows 2 "V" seal flanges with a metal seal, in a compressed or assembled.
Figure 5A:
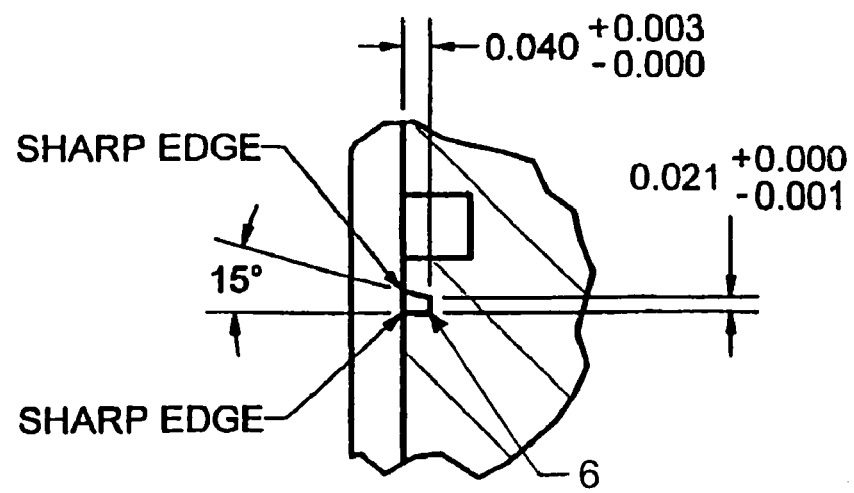
FIG. 5A shows a blow-up of the partial cross-section of a flange in accordance with the subject invention, as shown in FIG. 5B, incorporating a sealing groove for accepting a sealing piece, showing a cross-section of the sealing groove.
Figure 5B:
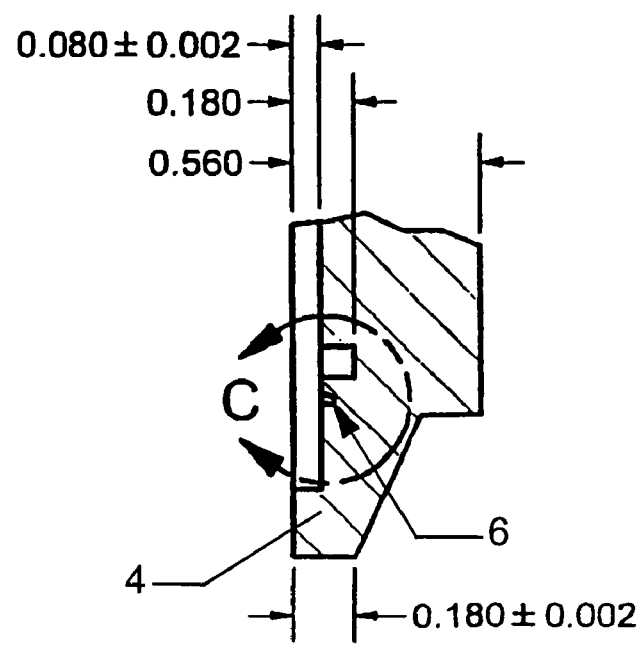
FIG. 5B shows a partial cross-section of a flange in accordance with the subject invention incorporating a sealing groove for accepting a sealing piece, showing a cross-section of the sealing groove.
Figure 6:
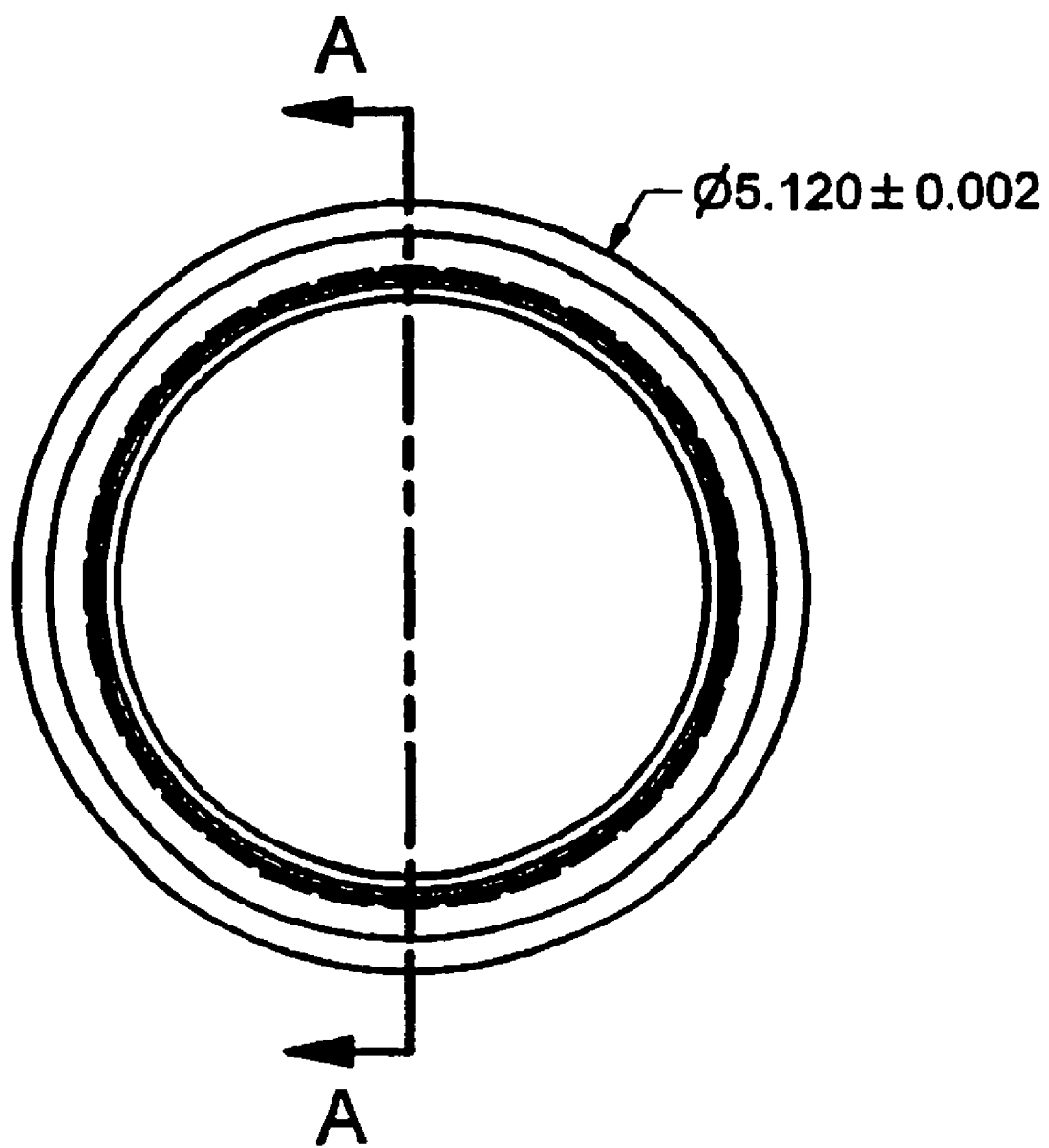
FIG. 6 shows a top view of a sealing piece in accordance with the subject invention.
Figure 7A:
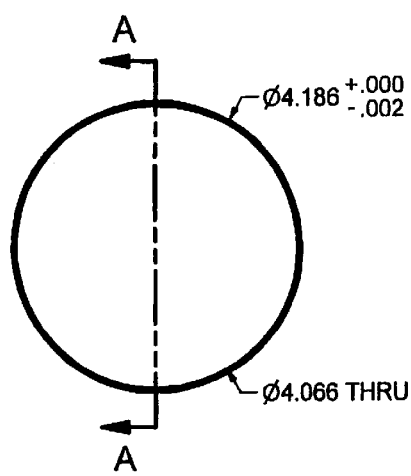
FIG. 7A shows a top view cross-section of a sealing piece in accordance with the subject invention.
Figure 7B:
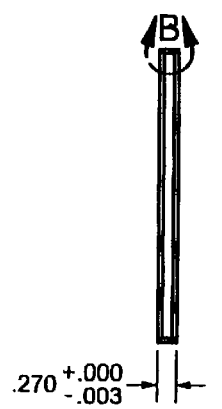
FIG. 7B shows a side-view cross-section of a sealing piece in accordance with the subject invention.
Figure 7C:
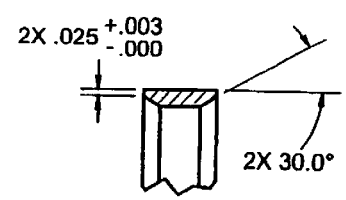
FIG. 7C shows a blow-up of a portion of the side-view cross-section of the sealing piece shown in FIG. 7B.
Figure 8:
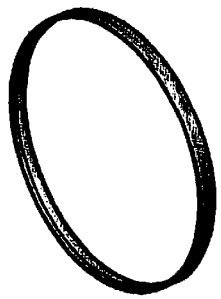
FIG. 8 shows a perspective view of a sealing piece in accordance with the subject invention.

Referring to FIGS. 1–4, a specific embodiment of the subject invention incorporating a V-seal flange 1 is shown. FIG. 1 shows the use of matching V-seal flanges 1 with an elastomer seal between the flanges, in a dissembled state. In the embodiment shown in FIG. 1, the flanges 1 are sexless and infinitely rotatable. The use of two flanges which are identical is preferred, although the flanges need not be identical. The flange pair shown in FIGS. 1–4 can accept either an elastomer seal 2 as shown in FIG. 1 and 2 or a metal seal 5 as shown in FIGS. 3 and 4.

The elastomer seal 2 can incorporate an internal support sing 8B with elastomer O-ring 8A. In a specific embodiment, the internal support ring 8B can be stainless steel. The elastomer O-ring 8A can comprise various compounds, depending upon the application. In a specific embodiment, a clamshell type clamp can be used to compress flanges 1 together. Such compressing an "torque" the O-ring to create a leak tight seal. Other means for compressing flanges 1 together can also be utilized. Compression of flanges 1 together can cause protruding lips 4 on flange 1 to come together, metal-to-metal, creating an ideal compression rate on O-ring for proper sealing. This can reduce, or eliminate over torquing of O-ring. Once protruding lips 4 come in contact with each other, additional compression is prevented. Protruding lips 4 can also protect the sealing surface when flanges are in storage prior to assembly and the elastomer ring 8A. The outer diameter of O-ring 8A can be contained by protruding lips so that positive internal pressure is contained by seal.

Typically, metal seals relying on a harder metal contacting a softer metal, such as Conflat® flanges, may be used on time. This is because the softer metal is deformed and cannot be re-used because the seal cannot be recreated in the same location as a previous deformation (groove). Conflat® flanges do not allow for re-location of the seal so that the knife-edge of the flange can bite into virgin material. At this point, the metal seal must be replaced since no additional "torquing" of the seal can occur. The subject sealing system can allow re-sealing due to movement of the point-of-seal along the angled sealing face (see, for example, 7B in FIG. 3B) as the seal re-sets deeper into the groove 6 (see, for example, FIG. 3A) with subsequent re-seals. This resealing can be accomplished with seals formed of different materials than the flange with respect to which the seal creates a seal or with seals formed of the same material as the flange.

In a specific embodiment of the subject invention, the metal seal can be made of the same material as the metal flange, and since the seal is not created by harder metals cutting into softer metals (as occurs in other all-metal sealing systems), the subject seal can be reused more times. In a specific embodiment, the subject seal can be made from the same stainless as the flanges. This greatly enhances flange use in applications which see extreme temperature, pressure of corrosive situations.

In a specific embodiment, the subject flanges 1 in a V-seal sealing system can incorporate a recessed groove 6. FIGS. 1–4 show an example of such an embodiment. Referring to FIGS. 1 and 2, when the subject invention is to be used with an elastomer seal, the elastomer seal area can be protected by protruding lips 4 on flange 1. These protruding lips can also enable precise "torquing" of an elastomer seal to occur, as well as containing an outer diameter of the O-ring. Containing the outer diameter of the O-ring can enable the O-ring to contain positive internal pressure. In a specific embodiment, the contained O-ring can contain positive internal pressures of at least +300 PSI, as well as negative vacuum pressure.

Referring to FIGS. 3 and 4, the recessed groove can accept the seal and hold it in place during the assembly process. A recessed metal sealing groove 6, as shown in FIG. 3A, is much less susceptible to damage than, for example, the exposed "knife edge" of a Conflat® flange. Recessed groove 6 and metal seal 5 can interact such that metal seal 5 is self-centered with respect to recessed groove. Such self-centering enhances the ease of assembly and reduces improper interface between the two mating flanges. This self-centering feature can reduce in greatly reduced assembly time. Recessed groove 6 in flange 1 can offer protection to sealing surface 7A. The subject seal can be re-used multiple times since minimal distortion of the seal occurs each time seal is made. Referring to FIGS. 3A and 3B, the subject seal can be made when knife-edge 71 bits into the angle face 7B on the seal. This bit deforms the point of contact on the sealing ring. The pressure at this point of contact forces sealing ring material to fill microscopic surface imperfections in the knife-edge and generates an all-metal, leak tight fit. Recessed groove 6 and protruding lips 4 offer protection to the knife-edge 7I. The subject seal can be re-used multiple times because of the movement of the point of seal along the angled sealing surface 7B. During subsequent re-seals the sealing ring can move deeper into the flange groove 6 and exposes virgin sealing materials to knife-edge 7I. As clamp 3 is tightened, flanges 1 are forced together.

Referring to FIGS. 3A and 3B, the specific embodiment shown incorporates a seal edge 7C which is perpendicular to the plane of the seal and flange wall 7E which is parallel to the plane of the seal, where the plane of the seal is perpendicular to the longitudinal axis of the flange and the longitudinal axis of the seal. In a specific embodiment, the seal angle, namely the angle face 7B makes with seal edge 7C, and the groove angle, namely the angle face 7A make with the normal to flange wall 7E can be dissimilar. Stated another way, the seal angle, and the groove angle, are the angles face 7B, and face 7A, make with the normal to the plane of the seal, respectively. In a specific embodiment, the seal angle is greater than the groove angle which allows the embodiment shown in FIG. 3A to function properly as an all metal seal. Preferably, the groove angle is between about 0° and about 30°, more preferably between about 5° and about 25°, even more preferably between about 10° and about 20°, and most preferably about 15°. Preferably, the seal angle is between about 15° and 45°, more preferably between about 20° and about 40°, even more preferably between about 25° and about 35°, and most preferably about 30°. Preferably, the difference between the seal angle and the groove angle, or the angle face 7B make with respect to face 7A, is between about 5° and about 40°, more preferably between about 10° and about 30°, and most preferably about 15°. In a specific embodiment, the seal angle is about 30° and the groove angle is about 15° and the face 7B make an angle of 15° with respect to face 7A.

Incorporating a difference between the angle of angled groove face 7A and the angle of angled sealing surface 7B of the seal allows machining tolerances such that the subject sealing method and apparatus can be utilized in flange systems having up to 1" diameter flanges, in flange systems having up to 2" diameter, in flange systems having up to 3"

diameter flanges, in flange systems having up to 4" diameter flanges, and in flange systems having flanges of greater than 4" diameter. The machining tolerances arise because differences in the angles 7A and 7B within the standard variance of the machining are still within acceptable standards and still allow the subject sealing method and apparatus to function properly.

Referring to FIG. 3B, flange wall 7E, which can also be referred to as a flange surface, lies in a plane perpendicular to the longitudinal axis of the flange and back groove face 7G lies in a plane perpendicular to the longitudinal axis of the flange. Again referring to FIG. 3B, the outer groove face 7D is perpendicular to flange wall 7E, and inner groove face 7A makes an angle with the longitudinal axis of the flange, or a normal to flange wall 7E, referred to as the groove angle. FIG. 3B shows the inner surface 7J of the protruding lip 4 being parallel with the longitudinal axis of the flange. FIG. 3B also shows the seal edge 7C, or outer surface of the seal 7C, and the inner seal surface 7F being parallel with the longitudinal axis of the seal and the side edge 7H of the seal being perpendicular to the longitudinal axis of the seal, such that seal face 7B is at an angle with respect to a normal to the side edge 7H referred to as the seal angle. Accordingly, the groove angle is the angle the inner groove face 7A makes with the longitudinal axis of the flange as the inner groove face 7A reaches the flange wall 7E to create sharp edge 7I and the seal angle is the angle is the angle seal face 7B make with the longitudinal axis of the seal at the point of contact with sharp edge 7I, where sharp edge 7I is at the intersection of face 7A with flange wall 7E.

In this way, in one or more alternative embodiments, one or more of the following can describe the embodiment: flange wall 7E, on one or both sides of groove 6, need not lie in a plane perpendicular to the longitudinal axis of the flange; outer groove face 7D need not be perpendicular to flange wall 7E; outer groove face 7D need not be parallel to the longitudinal axis of the flange; side edge 7H need not be perpendicular with the longitudinal axis of the seal; side edge 7H need not exist such that seal face 7B can meet seal edge 7C; back groove face 7G need not be perpendicular with the longitudinal axis of the flange; back groove face 7G need not exist such that outer groove face 7D can meet inner groove face 7A; seal inner surface 7F need not be parallel with the longitudinal axis of the seal; the inner surface 7J of the protruding lip 4 of the flange of the flange need not be parallel with the longitudinal axis of the flange; and one or more of the surfaces 7A, 7B, 7C, 7D, 7E, 7F, 7G, 7H, and 7J need not be flat or planar, but can be concave or convex if desired. In a preferred embodiment, seal edge 7C and outer groove 7D are parallel to each other and, in a most preferred embodiment, are both parallel to the longitudinal axis of the flange. In a preferred embodiment, the groove 6 and seals are designed such that at the point of contact between face 7B and sharp edge 7I, the contact occurs at a point. In this way, the seal angle at the point of contact on face 7B is larger than the groove angle at the sharp edge 7I, i.e., the angle face 7A make with the longitudinal axis of the flange proximate the sharp edge 7I, and the is no additional contact between face 7A and face 7B other than this point of contact. It is understood that point of contact is an approximate term used when referring to FIG. 3B which differentiates the contact from an interference fit type of contact where the surfaces 7A and 7B would be in contact over a larger area, and that the contact region is where sharp edge 7I meets face 7B, which would have a ring shaped contact region.

In a specific embodiment, the flanges 1 and the metal seal 5 can be made of the same metal, such as stainless steel. In comparison, with typical metal systems which create a seal by deforming a softer metal seal between two harder flanges, an embodiment of the subject sealing system using the same materials for the flanges and the seal can be sealed reliably through extreme temperature fluctuation without losing seal integrity due to the similarity in the thermal co-efficient of expansion of the materials. Multiple use of seals is not possible in such typical systems as compared to "V" seal. The subject V-seal creates a seal in which the edge of the sealing groove in the flanges becomes a "knife edge" which "bits" into the sealing piece, or seal. The angle of the seal and the flange groove are dissimilar such that under pressure of a flange clamp to forces the flanges and seal together, resulting in a "galling" or deformation of the seal so as to impede airflow and create a seal. Due to the dissimilarity of angle 7A and angle 7B the deformation of the sealing piece does not prevent the sealing piece from being used multiple times, rather, the sealing piece can be used multiple times and can often be used until the groove in the sealing piece resulting from the "galling" by the "knife edge" exhausts the angled sealing surface 7B of the sealing piece. Advantageously, the sealing mechanism of the subject system can reduce or eliminate trapped air which can leak into the system once a vacuum is established.

Referring to FIGS. 3A and 3B, in a specific embodiment, the outer diameter of the seal 5, from seal edge 7C to seal edge 7C is approximately the same as the outer diameter of the groove 6 from outer groove face 7D to outer groove face 7D such that groove 6 helps the seal to self-align in the groove and such that outer groove face 7D and seal edge 7C come into contact and outer groove face 7D pushes seal edge 7C when the flanges 1 are squeezed toward each other so as to push face 7B onto sharp edge 7I to uniformly distribute the sealing torque onto the seals inner diameter and onto face 7B to make a seal.

Figure 9A:
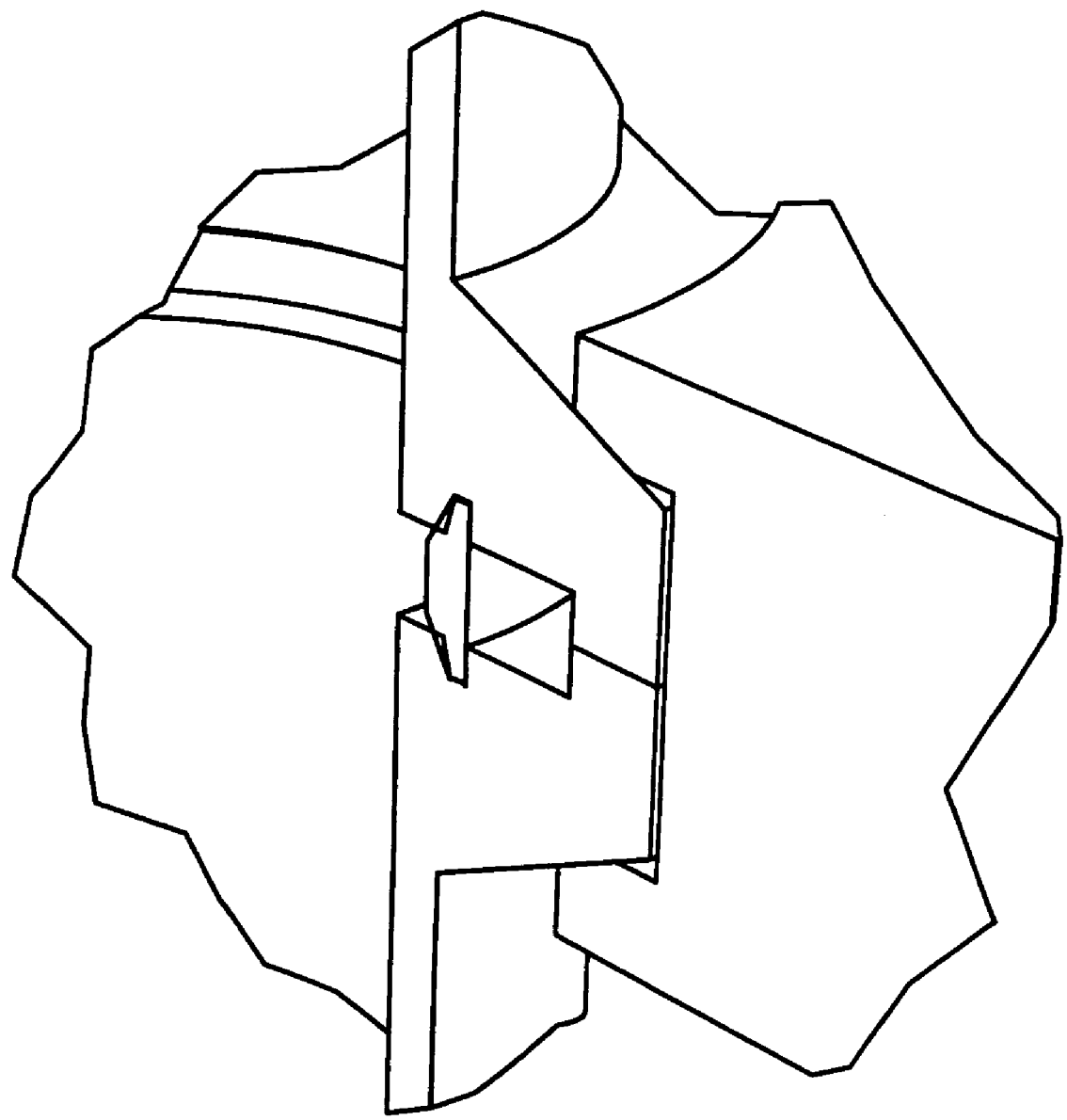
FIGS. 9A and 9B show a cut-away view of a pair of flanges and a seal held together by a single clamping means, in accordance with a specific embodiment of the subject invention, where
Figure 9B:
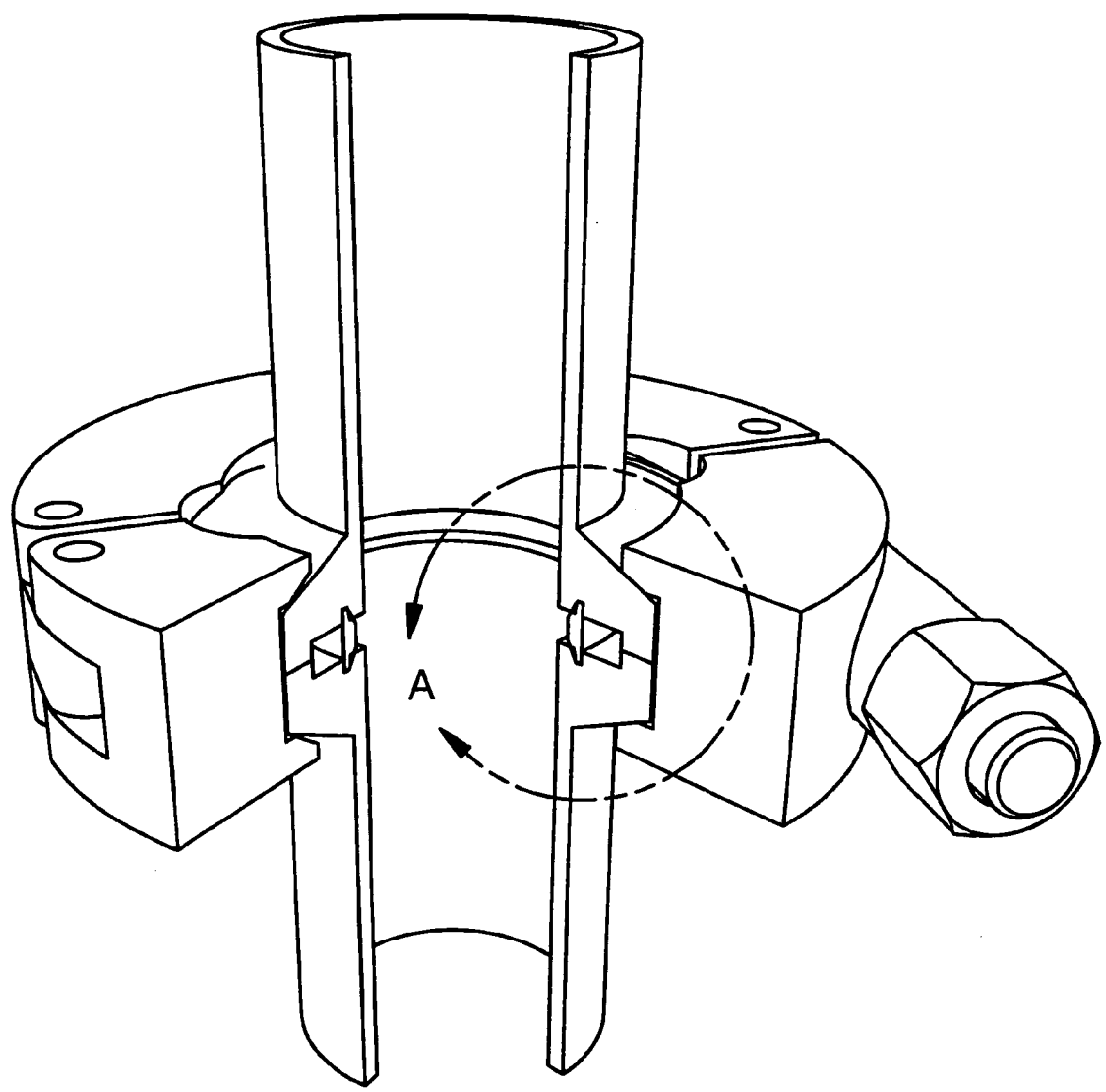

Referring to FIGS. 9A and 9B, sharp edge 7I is shown overlaid into face 7B to show how sharp edge 7I bites into face 7B (reference numbers removed for clarity). FIGS. 9A and 9B also show the seal 5 bottoming out in the groove 6 and protruding tips 4 coming into contact and preventing further movement of the flanges toward each other. Accordingly, FIGS. 9A and 9B illustrates the subject system when the seal is used up and needs to be replaced.

Typical metals which can be utilized as the softer metals include, for example, copper, aluminum, zinc, silver or even gold. In an embodiment where both flanges 1 and the seal 5 are made of stainless steel, the stainless seal is not greatly deformed each time a seal is made and the seal may be reused multiple times before replacement. Materials other than metal can be utilized for the sealing surface of the subject seal, such as Teflon. The choice of material can impact the vacuum level that can be achieved with the subject flange system.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An apparatus for creating a seal, comprising:
a seal having a first inner seal face and a second inner seal face, wherein the first inner seal face makes a first seal angle with the longitudinal axis of the seal, wherein the first seal angle is between about 15° and about 45°, wherein the second inner seal face makes a second seal angle with the longitudinal axis of the seal, wherein the second seal angle is between about 15° and about 45°;
a first flange having a first groove in a first flange surface for receiving a first side edge of the seal, wherein the first flange is made of a first metal;
a second flange having a second groove in a second flange surface for receiving a second side edge of the seal, wherein the second flange is made of a second metal;
a means for holding the first flange and second flange together with the seal positioned between the first flange and the second flange,
wherein the first inner seal face makes contact with a first sharp edge formed by a first inner groove face of the first groove and the first flange surface of the first flange such that a seal is created between the first sharp edge and the first inner seal face, wherein the first inner groove face makes a first groove angle with the longitudinal axis of the flange, wherein the first seal angle is greater than the first groove angle,
wherein the second inner seal face makes contact with a second sharp edge formed by a second inner groove face of the second groove and the second flange surface of the second flange such that a seal is created between the second sharp edge and the second inner seal face, wherein the second inner groove face makes a second groove angle with the longitudinal axis of the flange, wherein the second seal angle is greater than the second groove angle.

2. The apparatus according to claim 1,
wherein the seal is made of a third metal.

3. The apparatus according to claim 2,
wherein the third metal is the same as the first metal and the second metal.

4. The apparatus according to claim 2, wherein third metal is softer than the first metal and the second metal.

5. The apparatus according to claim 1, wherein the first groove comprises a first outer groove face and the seal comprises a seal outer surface, wherein the outer diameter of the first groove, from first outer groove face to first outer groove face, is approximately equal to the outer diameter of the seal, from seal outer surface to seal outer surface, such that the first outer groove face contacts the seal outer surface as the first flange and second flange are held together with the seal positioned between the first flange and the second flange.

6. The apparatus according to claim 5,
wherein the first outer groove face and the seal outer surface are parallel when the seal is positioned between the first flange and the second flange and the longitudinal axis of the first flange is aligned with the longitudinal axis of the seal.

7. The apparatus according to claim 5,
wherein the first outer groove face is parallel to the longitudinal axis of the first flange and the seal outer surface is parallel to the longitudinal axis of the seal.

8. The apparatus according to claim 1, wherein the second metal is the same as the first metal.

9. The apparatus according to claim 1,
wherein the first and second flanges are sexless.

10. The apparatus according to claim 1,
wherein the first and second flanges are infinitely rotatable.

11. The apparatus according to claim 1,
wherein the means for holding the first flange and second flange together with the seal positioned between the first flange and the second flange is a single clamping means.

12. The apparatus according to claim 11, wherein the single clamping means brings the first and second flanges together to create a seal.

13. The apparatus, according to claim 1, wherein the first and second flanges have inner diameters of at least 1 inch.

14. The apparatus, according to claim 1, wherein the first and second flanges have inner diameters of at least 2 inches.

15. The apparatus, according to claim 1, wherein the first and second flanges have inner diameters of at least 3 inches.

16. The apparatus, according to claim 1, wherein the first and second flanges have inner diameters of at least 4 inches.

17. The apparatus according to claim 1,
wherein the first groove angle is between about 0° and about 30°.

18. The apparatus according to claim 1,
wherein the first groove angle is between about 5° and about 25°.

19. The apparatus according to claim 1,
wherein the first groove angle is between about 10° and about 20°.

20. The apparatus according to claim 1,
wherein the first groove angle is about 15°.

21. The apparatus according to claim 1,
wherein the first seal angle is between about 20° and about 40°.

22. The apparatus according to claim 1,
wherein the first seal angle is between about 25° and about 35°.

23. The apparatus according to claim 1,
wherein the first seal angle is about 30°.

24. The apparatus according to claim 1,
wherein the first metal is stainless steel.

25. The apparatus according to claim 24,
wherein the second metal is stainless steel.

26. The apparatus according to claim 25,
wherein the seal is made of stainless steel. the seal outer surface is parallel to the longitudinal axis of the seal.

27. The apparatus according to claim 1, further comprising a second seal, wherein the second seal is interchangeable with the seal, wherein the second seal comprises an elastomer.

28. The apparatus according to claim 1,
wherein the first sharp edge causes deformation of the first inner seal face at a point that the first inner seal face makes contact with the first sharp edge, and wherein the second sharp edge causes deformation of the second inner seal face at a point that the second inner seal face makes contact with the second sharp edge.

29. The apparatus according to claim 28,
wherein upon a subsequent re-sealing, the first side edge of the seal moves deeper into the first groove such that virgin sealing material of the first inner seal face is exposed to the first sharp edge, and the second side edge of the seal moves deeper into the second groove such that virgin sealing material of the second inner seal face is exposed to the second sharp edge.

30. The apparatus according to claim 1, wherein the seal created between the first sharp edge and the first inner seal face and the seal created between the second sharp edge and the second inner seal face substantially prevents air from becoming trapped.

31. The apparatus according to claim 1, wherein the difference between the first seal angle and the first groove angle is between about 5° and about 40°.

32. The apparatus according to claim 1, wherein the difference between the first seal angle and the first groove angle is between about 10° and about 30°.

33. The apparatus according to claim 1, wherein the difference between the first seal angle and the first groove angle is about 15°.

* * * * *

UNITED STATES PATENT AND TRADEMARK OFFICE
CERTIFICATE OF CORRECTION

PATENT NO. : 7,159,906 B1
APPLICATION NO. : 10/771484
DATED : January 9, 2007
INVENTOR(S) : Norman U. Vaudreuil (deceased) et al.

It is certified that error appears in the above-identified patent and that said Letters Patent is hereby corrected as shown below:

Column 2,
Line 2, "flange to infinitely rotated" should read -- flange to be infinitely rotated --.

Column 3,
Line 38, "which can to enable" should read -- which can enable --.
Line 51, "compressed or assembled" should read --compressed or assembled state--.

Column 5,
Line 6, "which can be enable" should read --which can enable--.
Lines 37-38, "used on time." should read -- used one time. --.

Column 6,
Line 16, "can reduce" should read --can result --.

Column 7,
Line 28, "the seal angle is the angle is the angle seal face 7B make" should read --the seal angle is the angle seal face 7B makes--.
Line 59, "the is no additional" should read -- there is no additional --.

Column 8,
Lines 13-14, "which "bits" into" should read -- which "bites" into --.

Column 8,
Line 16, "a flange clamp to forces the flanges and seal together"
should read --a flange clamp, the flanges and seal are forced together --.

UNITED STATES PATENT AND TRADEMARK OFFICE
CERTIFICATE OF CORRECTION

PATENT NO. : 7,159,906 B1
APPLICATION NO. : 10/771484
DATED : January 9, 2007
INVENTOR(S) : Norman U. Vaudreuil (deceased) et al.

It is certified that error appears in the above-identified patent and that said Letters Patent is hereby corrected as shown below:

<u>Column 10,</u>
Line 47-48, "wherein the seal is made or stainless steel. the seal outer surface is parallel to the longitudinal axis of the seal." should read --wherein the seal is made of stainless steel.--

Signed and Sealed this

Fourteenth Day of August, 2007

JON W. DUDAS
*Director of the United States Patent and Trademark Office*